(12) United States Patent
Birk et al.

(10) Patent No.: US 7,769,302 B1
(45) Date of Patent: Aug. 3, 2010

(54) METHOD AND APPARATUS FOR ADJUSTING FOR POLARIZATION-INDUCED, OPTICAL SIGNAL TRANSIENTS

(75) Inventors: Martin Birk, Belford, NJ (US); Xiang Zhou, Holmdel, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 633 days.

(21) Appl. No.: 11/717,380

(22) Filed: Mar. 13, 2007

(51) Int. Cl.
*H04B 10/00* (2006.01)
*H04B 10/08* (2006.01)
*H04B 17/00* (2006.01)

(52) U.S. Cl. .......................... 398/159; 398/31; 398/152

(58) Field of Classification Search .................... 398/31, 398/147, 148, 149, 150, 152, 158, 159, 160, 398/161
See application file for complete search history.

(56) References Cited

U.S. PATENT DOCUMENTS

| | | |
|---|---|---|
| 5,699,178 A | 12/1997 | Ostlund |
| 6,031,659 A * | 2/2000 | Okiyama ................ 359/341.42 |
| 6,130,766 A * | 10/2000 | Cao ........................... 398/147 |
| 6,275,313 B1 | 8/2001 | Denkin et al. |
| 6,498,677 B1 | 12/2002 | Sun et al. |
| 6,574,037 B2 | 6/2003 | Islam et al. |
| 6,654,958 B1 | 11/2003 | Roberts et al. |
| 6,734,955 B2 | 5/2004 | Wight et al. |
| 6,813,067 B1 | 11/2004 | Birk et al. |
| 7,142,356 B2 | 11/2006 | Zhou et al. |
| 2002/0044317 A1 | 4/2002 | Gentner et al. |
| 2003/0081291 A1* | 5/2003 | Nishimura et al. .......... 359/161 |
| 2003/0202798 A1* | 10/2003 | Chou et al. .................. 398/159 |
| 2004/0001710 A1 | 1/2004 | Peeters et al. |
| 2004/0131353 A1 | 7/2004 | Cannon et al. |
| 2006/0127086 A1 | 6/2006 | Frankel |

FOREIGN PATENT DOCUMENTS

EP  1 248 334 A2  10/2002

OTHER PUBLICATIONS

X. Zhou, et al., "A simple Feed-Forward Control Algorithm for Fast Dynamic Gain Profile Control in a Multiwavelength Forward-Pumped Raman Fiber Amplifier", IEEE Photonics Technology Letters, vol. 18, No. 9, pp. 1004-1006, May 1, 2006.

X. Zhou, et al., "Submicrosecond Transient Control for a Forward-Pumpted Raman Fiber Amplifier", IEEE Photonics Technology Letters, vol. 17, No. 10, pp. 2059-2061, Oct. 2005.

X. Zhou, et al., "A New Technique for Dynamic Gain Profile Control in a Multi-Wavelength Backward-Pumped Discrete Raman Amplifier", Optical Fiber Communication Conference, 2006 National Engineers Conference, OFC 2006.

(Continued)

*Primary Examiner*—Nathan M Curs

(57) ABSTRACT

The invention includes methods and apparatuses to adjust an optical signal transmitted through an optical amplifier, such as in a wavelength division multiplexed optical network. The methods and apparatus of the invention calculate polarization effects which cause degradation to the optical signal. A measurement of the polarization-related degradation of an optical signal is calculated by using at least one reference signal. In some embodiments of the invention, the reference signal is depolarized or has scrambled polarizations. The invention is typically used in long-haul optical networks.

27 Claims, 6 Drawing Sheets

OTHER PUBLICATIONS

X. Zhou, et al., "Gain Clamping Performance of a Feed-Forward Pump Control Method with Non-Flat Signals in a Multi-Wavelength-Pumped Discrete Raman Fiber Amplifier", 2006 Conference Optical Amplifiers and their Applications (QAA2006) by Optical Society of America, Jun. 25, 2006.

X,Zhou, et al., "Fast, Low-Cost Method for Control of Gain and Tilt Transients in a Forward-Pumped Raman Amplifier", 31st European Conference on Optical Communication (ECOC2006) by IEEE vol. 3, Sep. 25, 2005, pp. 573-574.

P.M. Krummrich, et al., "Experimental Investigation of Compensation of Raman-Induced Power Transients from WDM Channel Interactions", IEEE Photonics Technology Letters, vol. 17, No. 5, pp. 1094-1096, May 2005.

M. Zirngibl, et al., "Analytical Model of Raman Gain Effects in Massive Wavelength Division Multiplexed Transmission System", Electronics Letter, vol. 34, No. 8, pp. 789-790, 1998.

* cited by examiner

METHOD AND APPARATUS FOR ADJUSTING FOR POLARIZATION-INDUCED, OPTICAL SIGNAL TRANSIENTS

FIELD OF THE INVENTION

The present invention relates to dynamic optical networks and more particularly relates to improvements in the performance of such networks.

BACKGROUND OF THE INVENTION

The current trend in optical transmission networks is toward longer transmission distances with reduced signal regeneration, and the use of remotely re-configurable optical add/drop multiplexers (ROADM) to bring signals on and off the network backbone. ROADMs can be reconfigured dynamically in a process that is transparent to users. Current transmission distances reach ranges of 600 to 10,000 kilometers. Dynamic, transparent, optical networking results in improved transport economics and flexibility, but creates new problems such as the introduction of optical transients associated with adding and dropping channels into an optical transmission path. Signal attenuation also occurs due to a variety of factors including scattering, absorption, and bending. To compensate for signal loss and/or degradation, optical amplifiers (OA) are typically placed at regular intervals along the optical transmission path. Optical amplifiers amplify an input optical signal without converting it into electrical form Many optical communication systems, especially long-haul networks, are wavelength division multiplexed (WDM) or dense wavelength division multiplexed systems (DWDM). (In this application, the use of the abbreviation WDM refers to wavelength division multiplexed systems, dense wavelength division multiplexed systems, and the like.) Such systems incorporate multiple channels, each at a slightly different wavelength, that are transmitted over a single optical fiber. Typically, a WDM network carries up to 40 or 80 channels, each channel transmitting perhaps in the range of 10 to 40 gigabits/second. By using many channels, the amount of data that can be transmitted over a single fiber is greatly increased.

Typically, optical signals in a WDM system must be processed approximately every 80 km to 100 km to restore the signal quality. This processing typically involves the use of OAs. Optimally, OAs in such systems should amplify all wavelengths consistently. However, in operation, achieving such consistency with OAs is very difficult to realize. For example, over time, the amount of amplification tends to vary within each channel and as a whole. It is not always practical and can be costly to recalibrate or replace OAs whose efficacy has diminished.

OAs include rare earth doped fiber amplifiers such as erbium doped fiber amplifiers (EDFAs) and Raman amplifiers. An EDFA operates by passing an optical signal through an erbium-doped fiber segment, and "pumping" the segment with light from another source such as a laser. Similarly, Raman Amplification occurs when the transmission fiber is pumped at an appropriate wavelength or wavelengths while light at a given input wavelength is transmitted through the fiber. Raman Amplification functions by transferring energy from a powerful pump beam to an emitted signal beam which is then an amplified version of the weak input signal beam. In Raman Amplification, the amplified light is typically achieved at a wavelength that is longer than the pump wavelength. The difference between the pump wavelength and the associated, emitted, amplified wavelength is referred to as a "Stokes shift." The Stokes shift for a typical silica fiber is approximately 13 THz. Raman amplifiers provide amplification of an optical signal without the need for a specially doped fiber, such as used in an EDFA.

Stimulated Raman Scattering (SRS) is the basis for all Raman amplification. However SRS can also be a side effect of normal transmission of optical signals through a fiber, and, as such, can be a source of spurious light that results in signal degradation.

As a result of various loss and degradation mechanisms, the power loss that occurs as light is transmitted over greater distances is greater at shorter wavelengths than longer wavelengths. This causes a "spectral tilt" or simply "tilt" whereby the amplitude of the output spectrum varies with greater wavelength. Thus, the longer the distance of a fiber optic cable, the more pronounced is SRS, resulting in an increase in the power tilt towards the shorter wavelengths, i.e., higher frequencies.

Yet another cause of signal degradation is crosstalk which occurs when a signal at one wavelength interferes with the signal at another wavelength.

A Raman amplifier with a single pump may fail to provide gain over the bandwidth required in some WDM optical systems. To achieve a broadband gain characteristic, a plurality of pumps may be utilized in a single Raman amplifier. However, the gain spectrum from each pump tends to overlap such that a multi-pump Raman amplifier typically exhibits some variation in gain over the spectral range of the amplifier, known as "ripple." This disparity in imparted gain can negatively affect signal quality and thus, maximum throughput (i.e. the maximum amount of data per time that is delivered).

Further degradation of the signal quality occurs when the polarization changes. In a typical optical network, each wavelength travels at two polarizations. Typically, the polarization of the signal changes slightly due to the above-described effects on the signal as well as when the signal is amplified in an OA or passes through a ROADM. An amplification span, the distance between one OA and another OA in an optical network, is typically about 80 km to 100 km. A fiber optic link in a fiber optic network can run thousands of kilometers. Therefore, many OAs are often needed. The slight changes in polarization accumulate as the signal passes through multiple OAs or ROADMs. When the polarization changes, the amount of power loss and amplification also changes, thus, further degrading the signal quality.

Another problem occurs when there is a fiber optic cut or loss in signal. In a dynamic optical network, a ROADM typically incorporates signals coming from multiple fiber optic cables or links into a single cable or link. These fiber optic links may originate at locations distant from each other, meet at the ROADM, and continue to propagate along a single fiber optic link. For example, an uplink fiber optic cable may be using 20 channels. Another uplink fiber optic cable may use another 20 channels. The uplink fiber optic cables meet at a ROADM and 40 channels are propagated through a common length of fiber optic cable. When the data channels transmitted over the links reaches the intended destination a ROADM separates such channels from the link. However, channels that continue on to another destination may be propagated over a new fiber optic link. This is often done to save money and add flexibility to a network as less fiber optic cables are needed and channels can be added or dropped when necessary. If one of the uplink cables is cut, there is a sudden drop in power. Conversely, if more channels are added to the network, there is a sudden gain in power. However, the OAs on the common length of fiber optic cable continue to amplify as if the power remained constant. The fast power variation causes large power fluctuations for each remaining channel.

After passing through multiple OAs, a power surge occurs in the remaining channels whereby the signal strength of each channel increases at an increasing rate. This saturation effect results in increased and less predictable Raman Scattering, tilt, and polarization shifting. These effects cause the signal to be degraded and the performance of the network, such as the throughput, to decrease.

In recent years, many efforts have been made to deal with the above-described problems. U.S. Pat. No. 6,275,313 to Myron discloses that spectral distortion or Raman Scattering increases linearly with respect to input power. By keeping total input power constant through injecting one or more control signals, Raman Scattering can be predicted and precompensated for with an OA.

U.S. Patent Publication 2002/0044317 to Gentner, et al, expands the method disclosed in the above mentioned U.S. Pat. No. 6,275,313 by introducing a fast SRS tilt transient control system and a slow SRS static tilt control system. When adding or removing channels to a WDM, the overall power is measured and the power of the control signals are adjusted to make the total input signal power a constant. But this method runs the risk of introducing a severe four-wave-mixing (FWM) nonlinear penalty due to the high powers in the control signals. FWM is an intermodulation distortion in optical systems formed by the scattering incident photons.

U.S. Patent publication 2006/0127086 to Frankel and U.S. Patent Publication 2004/0131353 to Cannon, et al. provide methods of detecting a loss of signal and providing the signal from the other direction so as to maintain the same power within the optical link. This method complicates network design.

Krummrich, et al. ("Experimental investigation of compensation of Raman-induced power transients from WDM channel interactions," IEEE Photonics Technology Letters, Vol. 17, no. 5, pp. 1094-1096, May 2005), U.S. Patent Publication 2004/0001710 to Peeters, et al., and U.S. Pat. No. 7,142,356 to Zhou disclose methods of using a dynamic gain tilt compensator (DGTC) to adjust the signal based on measurements of tilt. The DGTC-based method has the advantage of fast control speed and simple network management lacking in other prior art methods of transient control. However, greater precision in adjustment to optical signals is needed.

Thus, while prior art DGTC systems are fairly effective in recovering the original signal, a significant uncertainty in the calculation of SRS gain/loss still exists. There remains a long felt and unsolved need to find a method of reducing the sensitivity of the Raman gain spectrum measurement to polarization-related events.

BRIEF SUMMARY OF THE INVENTION

The invention provides methods and apparatuses to adjust an optical signal transmitted through an optical amplifier comprising measuring polarization-related degradation of at least one reference signal transmitted through an optical amplifier and adjusting the optical signal transmitted through the optical amplifier based on the measured degradation.

In one advantageous embodiment of the invention, two depolarized reference signals are used to eliminate the uncertainty caused by polarization effects. The reference signals comprise at least one known characteristic which can be measured or estimated at two points on a fiber optic network, such as at the beginning and end of a fiber optic link. A DGTC or other controller is placed at an amplification span after a series of non-DGTC or non-controlled amplification spans in order to adjust an optical signal transmitted through the optical amplifiers.

In another advantageous embodiment of the invention, the reference signals go through a polarization scrambler to remove polarization effects on the reference signals.

In another advantageous embodiment of the invention, total optical power of all channels is measured in addition to the power of the reference channels.

In another advantageous embodiment of the invention, gain tilt is estimated from the total optical power. This measurement is used to adjust the tilt of the optical signal at the controller.

These and other advantageous features of the invention will become clear from the forthcoming detailed description of the invention.

DETAILED DESCRIPTION

Figure 1:
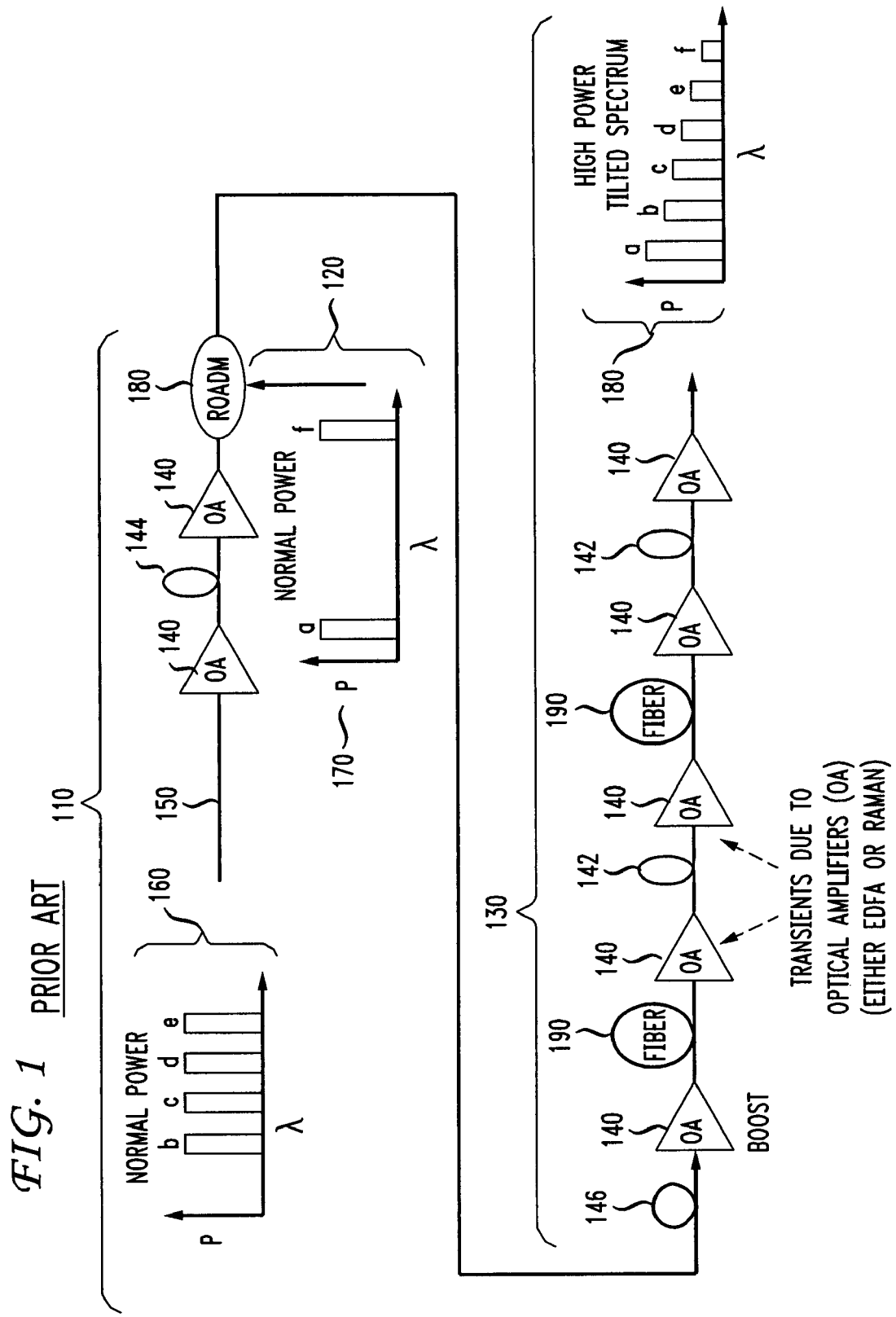
FIG. 1 shows a block diagram of an optical network known in the art.

FIG. 1 shows an optical network known in the art. The optical network uses a wavelength-division multiplexing system (WDM) to carry multiple optical signals at different wavelengths. In this example, schematic network span 110 contains four signals channels b, c, d, and e at four different wavelengths, depicted in graph 160. The power of the signals in each of the channels is roughly equal. While four channels are shown, it should be understood by a person having ordinary skill in the art that this is only for purposes of illustration and that any reasonable number of channels could be used, such as 40 channels in a WDM system or 80 channels in a DWDM system. Each channel b, c, d, and e propagates through fiber optic cable 150. Typically, every 80 km an optical amplifier (OA), such as an EDFA or Raman amplifier (as described in the background of the invention), is used to maintain signal strength. Schematic network link 120 is similar to that of schematic network link 110 except that in this example, wavelengths a and f are utilized.

Network link 110 and network link 120 terminate at the reconfigurable add-drop multiplexer (ROADM) 180. The ROADM is a device in the optical network which can be controlled remotely to switch traffic between channels, add channels, or drop channels in a WDM while maintaining the traffic in optical form. In this example, channels b, c, d, and e from network span 110 are multiplexed with channels a and f from network span 120. The multiplexed signals are outputted in network span 130.

Various dispersion compensating modules (DCM) may be used to nullify various types of dispersion. DCMs are commonly known in the art for removing the temporal spreading of light caused by light signals traveling at different speeds through a fiber. Typical DCMs may include post-DCM 144, pre-DCM 146, and in-line DCM 142.

Each OA 140 and ROADM 180 introduces transients which may modify the tilt and increase degradation due to Simulated Raman Scattering (SRS). The result is that after passing through a length of fiber optic cable 190 and multiple OAs 140 there is more power in the lower frequencies than the higher frequencies. As a result, crosstalk between channels can increase and throughput decreases.

The embodiments of the invention provide methods and apparatuses to adjust an optical signal, taking into account polarization effects which cause degradation to the optical signal. While the signal may be further adjusted based on other factors, the invention contemplates, at least in part, adjusting the signal to compensate for the effects of polarization. Calculation of tilt and average gain/loss typically proceeds in the following manner, though any reasonable means of calculation are contemplated. Two signals located at different wavelengths are monitored and used to decide how to adjust the tilt and average gain/loss of the DGTC or other controller. In the application, when DGTC is used, it should be understood that any controller capable of adjusting the signal to control transients is contemplated by the invention. As an example for this method, in an 80-channel WDM system, using the shortest wavelength signal (ch. 1) and the longest-wavelength signal (ch. 80), the output power deviation in Log scale as $\Delta S_1^{dB}$ for the first signal and $\Delta S_{80}^{dB}$ for the second signal, then the Raman gain tilt is estimated by $$T \approx \frac{\Delta S_{80}^{dB} - \Delta S_1^{dB}}{\lambda_{80} - \lambda_1} \quad (1)$$

where $\lambda_k$ denotes the wavelength of the k-th signal, and the Raman gain of any channel, say channel k, can be estimated by $$G_k^{dB} \approx \Delta S_1^{dB} + T(\lambda_k - \lambda_1) \quad (2)$$

From Eq. (1) and (2) the required tilt and the average gain/loss adjustment of the DGTC are $-T$ and $-\Delta S_1^{dB}$ can be calculated. An accurate measurement of Raman gain spectrum is the key for DGTC-based gain transient control methods.

In the practical C/L-band WDM system, the extra gain/loss due to SRS for a single span is typically smaller than 0.8 dB, which is within typically acceptable tolerance levels so there is no need to place a DGTC at every span. Therefore, one DGTC can be used to compensate for Raman gain transients generated from multiple amplification spans, such as between 4 and 6 amplification spans. In such a strategy, polarization-dependent gain/loss (PDL/PDG) from multiple optical amplifiers and other passive/active components may introduce considerable uncertainty in the Raman gain spectrum measurement using the polarized signals used in fiber optic networks. Polarization-related degradation is thus caused by these polarization effects whereby Raman transient control performance is degraded. For example, if each optical amplifier introduces 0.2 dB of PDL/PDG, then the accumulated mean PDG/PDL for a five-span WDM link is 0.63 dB and the maximum PDG/PDL can be as high as 2 dB (the accumulated PDG/PDLs can be higher if PDG/PDL from the ROADM and DGTC itself is taken into account). This implies that more than 2 dB uncertainty of $\Delta S_{80}^{dB} - \Delta S_1^{dB}$ can be introduced by purely polarization events.

Figure 2:
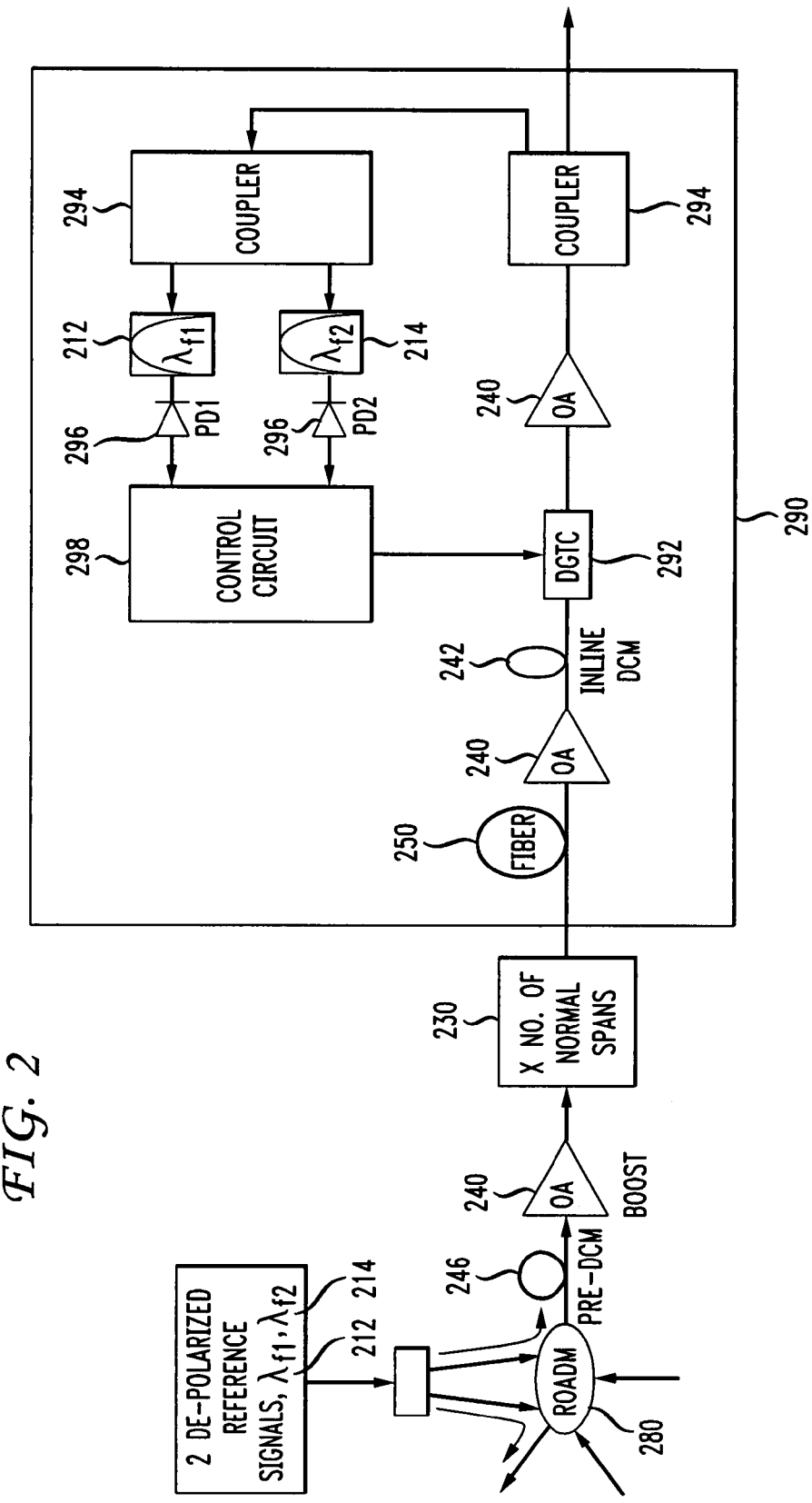
FIG. 2 shows a block diagram of a first embodiment of the invention where two depolarized reference signals are used.

FIG. 2 shows a first embodiment of the invention where two depolarized reference channels or signals 212 and 214 are used to eliminate the uncertainty caused by polarization effects. The reference signals 212 and 214 have different wavelengths and are added or multiplexed by means of a ROADM 180 into a fiber optic link containing a plurality of channels. The reference signals comprise at least one known characteristic which can be measured or estimated at two points on a fiber optic network, such as at the beginning and end of a fiber optic link. Alternatively, a polarization scrambler may be utilized which scrambles the states of polarization of the two reference signals 212 and 214. Reference numbers on FIG. 2 correspond to the reference numbers of FIG. 1. For example, reference signal 112 in FIG. 1 is reference signal 212 in FIG. 2. The reference signals 212 and 214 may be any depolarized light beam known in the art such as from a Distributed Feedback laser or a Fiber Bragg grating stabilized Fabry-Perot laser. By providing reference signals in an optical network, the effect on the reference signals of various parts of the network, such as the optical amplifiers, can be measured so as to aid in adjustment of the other signals in the optical network to compensate for degradation. Since the reference signals are depolarized or have a scrambled polarization, the effects of polarization on the signals is negligible and a more accurate calculation of degradation can be obtained by taking into account the power of the reference signals 212 and 214. Typically, reference signal 212 has a short wavelength and reference signal 214 has a long wavelength. Generally, the more distant in wavelength each reference signal is from the other, the more accurate are the tilt calculations because the difference in power due to tilt is greatest between a signals far apart in wavelength. However, each reference signal 212 and 214 may have any acceptable wavelength that will propagate within a fiber optic cable or optical network. Alternatively, it may be desired for the reference signals to have wavelengths outside of the WDM signal bandwidth, such as just above and just below the wavelengths used for data channels. The depolarized reference signals 212 and 214 may pass through multiple ROADMs 180 (not shown) and be used by multiple links in an optical network.

Depolarized reference signals are used because such reference signals are not subject to tilt due to polarization effects. While it is possible to depolarize all signals, at the present time, doing so is costly, so reference signals are advantageously used to measure degradation effects and to adjust signals accordingly. The measured change in power of the reference signals is therefore not a result of polarization effects but of Raman scattering. A more accurate measurement of tilt than previously known in the art can be measured by removing the effects of polarization from the calculation of the tilt. When the effects of polarization are known, a transmitted signal can be pre-compensated for, that is, the signal can be adjusted before it is propagated through the network. Typically, the measurement takes place every few spans on an optical network and compensation to recover the original signal takes place at each such location. Further, the depolarized reference signals may be transmitted in either direction over an optical link.

Referring again to FIG. 2, pre-DCMs 246, inline DCMs 242, and OAs 240 are utilized. A DGTC 292 is placed at an amplification span 290 after a series of non-DGTC amplification spans 230. While FIG. 2 shows only one set of non-DGTC amplification spans 230 followed by a DGTC amplification span 290, it should be understood that this is for purposes of illustration only. Each non-DGTC amplification span 230 can comprise any reasonable number of amplification spans, though the number is usually in a range between four and six. Further, only one iteration of the series of non-DGTC amplification spans 230 followed by DGTC amplification 290 is depicted. For long haul networks multiple iterations of non-DGTC amplification spans 230 followed by DGTC amplification span 290 will be repeated along an optic link.

At the amplification span 290, the reference signals 212 and 214 are separated from the fiber optic cable by couplers 294 and polarization descramblers 296. Based on the measurements described hereinabove, the DGTC 292 adjusts the Raman gain to recover the original signal and compensate for the tilt. The adjusted signal may then continue through the dynamic fiber optic network.

Figure 3:
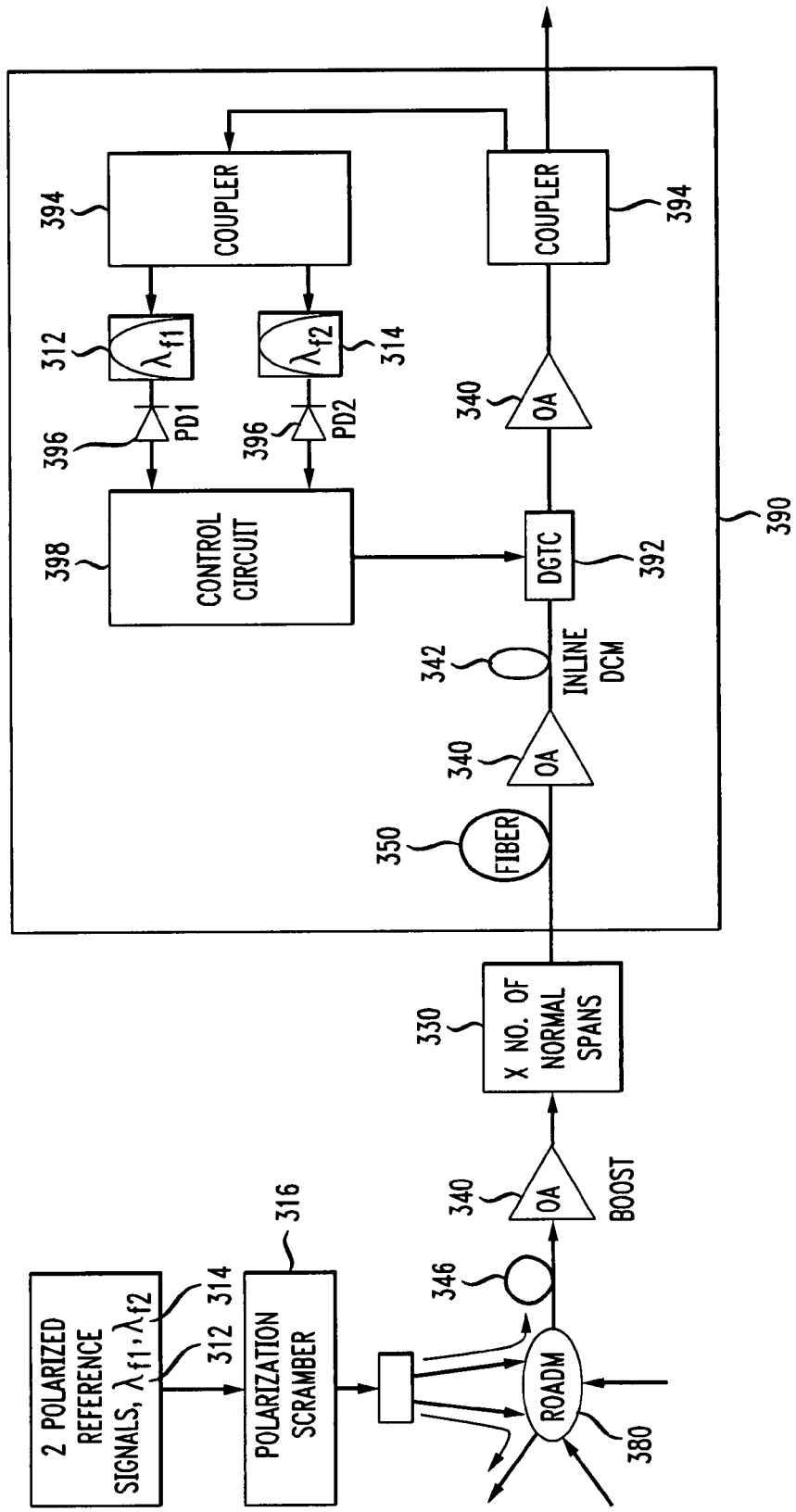
FIG. 3 shows a block diagram of the embodiment of FIG. 2 of the invention using a polarization scrambler.

FIG. 3 shows the embodiment of FIG. 2 of the invention using a polarization scrambler as described above. Reference numbers in FIG. 3 correspond to the reference numbers of FIG. 2. For example, reference signal 212 in FIG. 2 is reference signal 312 in FIG. 3. The reference signals 312 and 314 can be shared between multiple optical links and may be propagated in either direction along a fiber optic cable 350. The calculations proceed in a similar manner as in the first embodiment. However, in this embodiment, because the polarizations are scrambled, the reference signals 312 and 314 can also be used as data signals, thereby maintaining the total bandwidth of a multiplexed fiber optic cable without using channels outside of the range of the WDM.

In the above detailed description, two reference signals are shown. The present invention also allows more than two reference signals to be used. In this case, more accurate spectral distortion can be monitored because linear tilt is only the first order approximation of SRS spectral distortion.

Further, the method shown in the first embodiment where depolarized or scrambled reference signals are used is not limited to a DGTC-based transient control system (to improve the transient control performance against polarization-related impairment). The method may be used in other optical networks, such as link-control based transient control systems (see, for example, U.S. Pat. No. 6,275,313 and U.S. Patent Publication 2002/0044317), where several control signals are injected into the transmission fiber along with the original signals to maintain the total input power at a constant value during channel add/drop. In accordance with the present invention, by depolarizing or scrambling the SOPs (states of polarization) of the introduced control signals, transient control performance will be improved because SRS gains between these control signals will be independent of their input state of polarization.

Figure 4A:
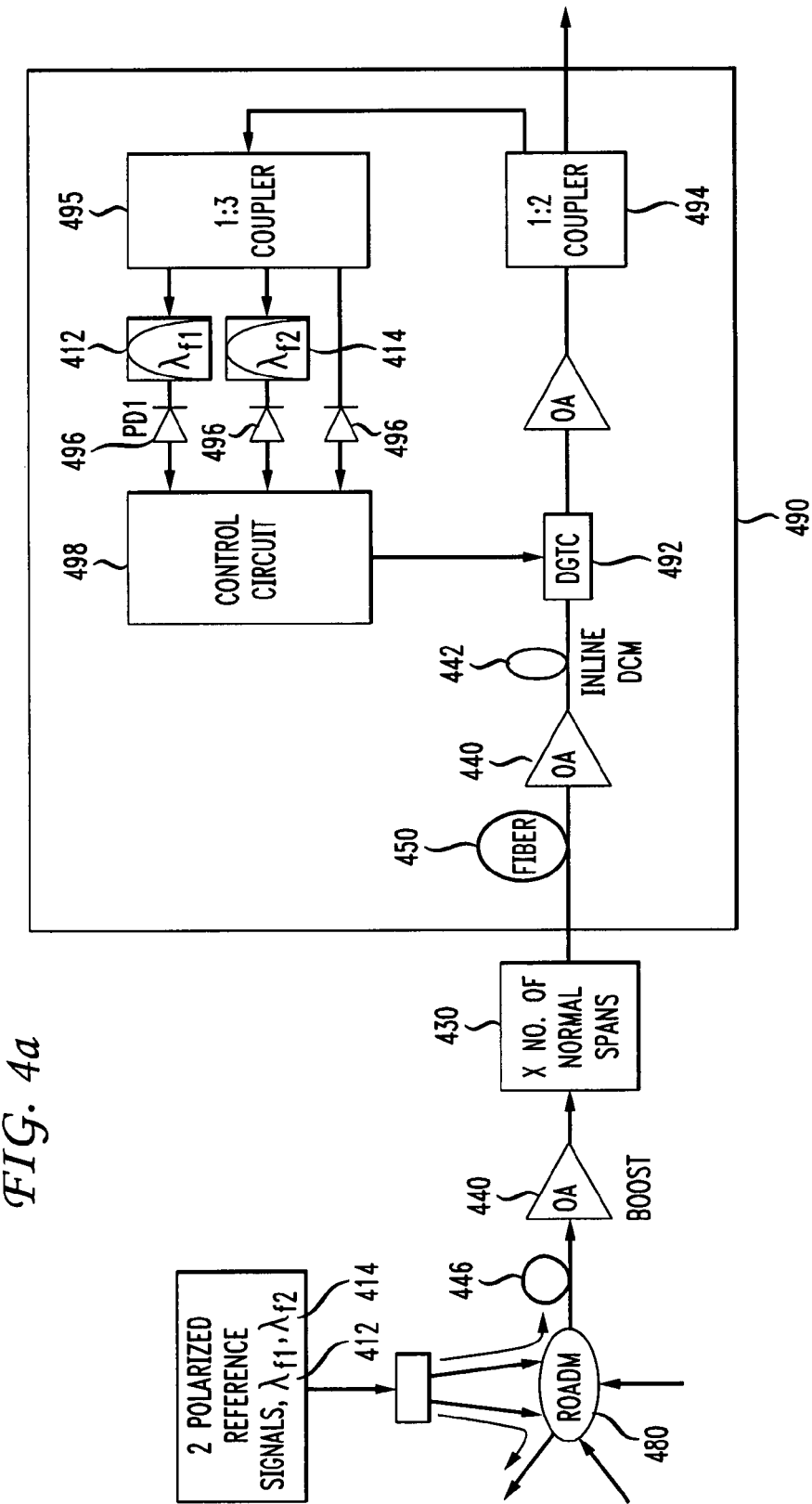
FIG. 4a shows a second embodiment of the invention where total optical power of all channels is measured in addition to the power of the reference channels.

FIG. 4a shows a second embodiment of the invention where total optical power of all channels is measured in addition to the power of the reference channels. The total optical power is the sum of the power transmitted in each channel propagating in the optical network. Reference numbers in FIG. 4a correspond to the reference numbers of FIG. 3. For example, reference signal 312 in FIG. 3 is reference signal 412 in FIG. 4a. As above, elements of FIG. 4a which correspond to elements in FIGS. 2 and 3 are given similar numbers. In this embodiment, a 1:2 coupler 494 sends the signals to be measured from the fiber optic cable 450 to the control circuit 498 by way of a 1:3 coupler 495 then separates the signal into the reference signal 412, reference signal 414, and entire transmitted signal. In this embodiment of the invention, the reference signals 412 and 414 are polarized.

Figure 4B:
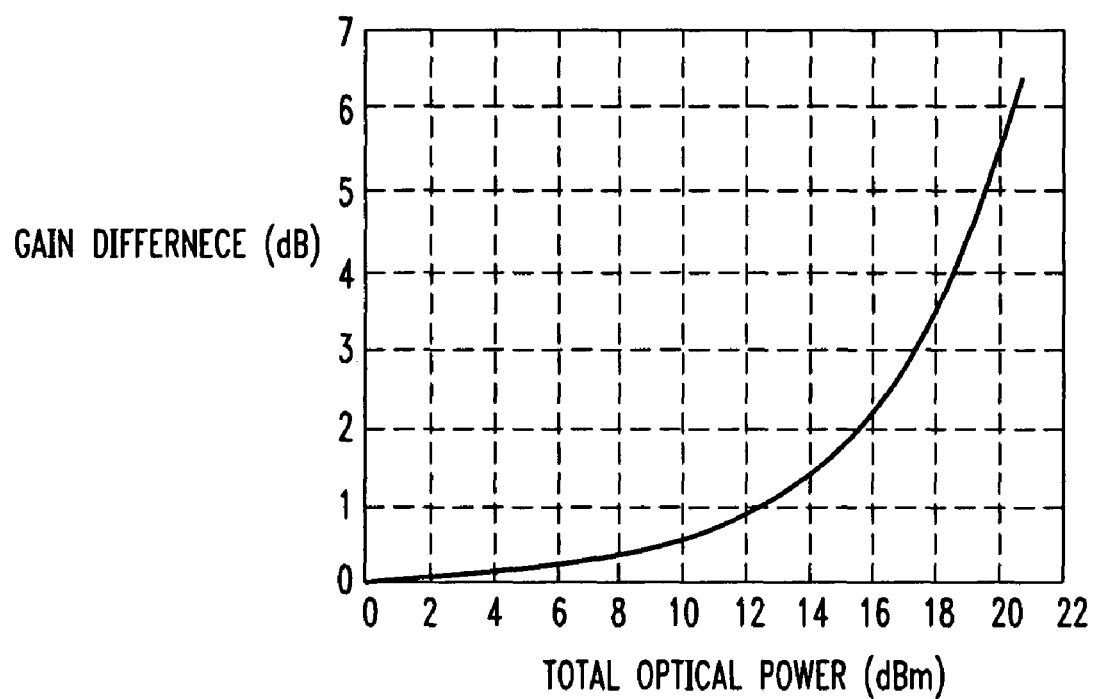
FIG. 4b shows a graph of the total optical power in dBm as a function of gain difference in dB for the second embodiment.

FIG. 4b shows the total optical power in dBm as a function of gain difference in dB in the second embodiment. As optical power is increased, the gain difference increases logarithmically. The gain difference in FIG. 4b refers to the amount of power gained at the lowest wavelength in the fiber optic cable 450 minus the amount of power gained at the highest wavelength in the fiber optic cable 450. By monitoring the total optical power in addition to the power of each reference signal 412 and 414, polarization-induced power variation between the two reference signals can be detected. By detecting polarization-induced power variation, false adjustment of the DGTC 492 can be avoided.

The control circuit 498 does the following calculation in order to restore the original signal, taking into account the power of each reference signal 412 and 414 as well as total optical power transmitted in the optical network. The Raman gain tilt T only depends on the total optical power as:

$$T \approx 4.343 M \beta P_t L_{eff} \quad (3)$$

where $M$, $\beta$, $P_t$, $L_{eff}$ denote the number of amplification spans, the slope of Raman gain coefficient, the total optical power in linear unit, and effective fiber length, respectively. In the example of FIG. 4b, the calculated gain difference between the two reference wavelengths as a function of log-scaled total input optical power for a five standard single mode fiber (SSMF) spans is depicted. For purposes of simplicity, in this example the two reference signals 412 and 414 are located at the two extreme wavelength, $\lambda_1$ and $\lambda_{80}$. In the foregoing example, $\Delta G_E^{dB}$ is used to describe the estimated gain difference between the two reference signals using the total optical power while use $\Delta G_M^{dB} (= \Delta S_{80}^{dB} - \Delta S_1^{dB})$ to denote the measured gain difference directly using the two reference signals 412 and 414. FIG. 4 shows that $\Delta G_E^{dB}$ increases only by 1.2 dB when the total power goes up from 0 to 14 dBm. However, when the total power increases from 14 dBm to 21 dBm, $\Delta G_E^{dB}$ grows faster but still less than 0.5 dB with 1 dB increase of total power. The measurement of the sum of optical power in multiple wavelengths (i.e. the total power) is less sensitive to polarization-related issues than measurement of optical power at individual wavelengths due to averaging effects, because different wavelengths are independent and randomly distributed on the Poincare sphere. Mathematically, if average optical power at each wavelength is identical, then the relatively power variation due to polarization-related issues will be inversely proportional to the square root of the number of wavelength.

Referring again to FIG. 4b, where total power is relatively large, i.e. greater than 14 dBm, the large total optical power corresponds to a large number of wavelengths. Therefore, polarization events will not cause significant power and $\Delta G_E^{dB}$ variation (statistically). Where total optical power is small, polarization events may cause larger relative power variation. A 1 dB total power variation results in a small variation of approximately 0.08 dB when the total optical power is smaller than 14 dBm. This implies that polarization events will not cause significant $\Delta G_E^{dB}$ variation even with relatively small total power. This suggests that the difference between the variations of $\Delta G_E^{dB}$ and $\Delta G_M^{dB}$ may be used to distinguish real power transient events from purely polarization events: a power transient event will cause comparable variations of $\Delta G_E^{dB}$ and $\Delta G_M^{dB}$ while a polarization event will not cause significant variation of $\Delta G_E^{dB}$ but may cause significant variation of $\Delta G_M^{dB}$. In the above discussion, the gain tilt estimated from the total optical power is only used to identify polarization events (not for tilt adjustment of the DGTC), so the absolute accuracy of $\Delta G_E^{dB}$ is not very important. As a result, this technique doesn't require direct measurement of the linear coefficient describing the relationship between T and $P_t$ (in linear unit). Instead, $\Delta G_E^{dB}$ can be estimated using typical parameters of various fiber types.

In this embodiment, it is contemplated that one polarized reference signal 412 could be used without the aid of a second reference signal 414. One skilled in the art would understand that the following calculations would proceed in a similar manner.

Figure 5:
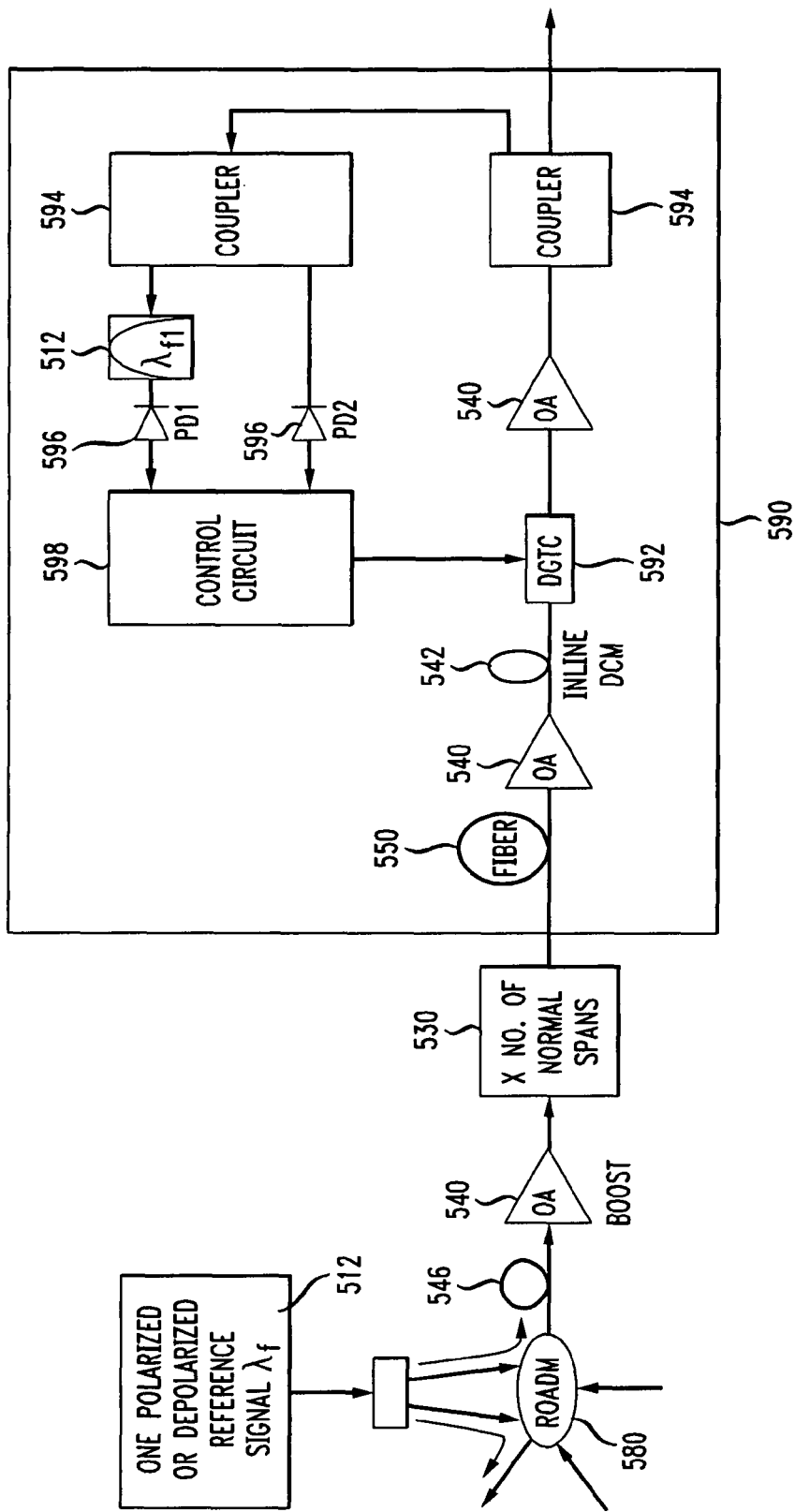
FIG. 5 shows a block diagram a third embodiment of the invention where gain tilt is estimated from the total optical power.

FIG. 5 shows a third embodiment of the invention where gain tilt is estimated from the total optical power. This measurement is used to adjust the tilt at the DGTC 592. This method proceeds by measuring total optical power transmitted in the optical link and the power in one reference signal 512. In this embodiment, the reference signal 512 may be polarized, depolarized, or scrambled. When the reference signal 512 is polarized, the amount of tilt can be estimated based on a comparison between the total optical power and optical power of the reference signal. For example, when the variation in the total optical power is relatively small and the measured relative power variation of the polarized reference signal is relatively large, it can be deduced that a polarization event has taken place which has affected the signal. This measurement can be used to compensate for the polarization effects.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for adjusting an optical signal transmitted through an optical network comprising:
    determining an estimated gain difference between a first reference signal and a second reference signal transmitted through an optical network;
    measuring a gain difference between the first reference signal and the second reference signal;
    determining a polarization-related degradation of the optical network based at least in part on a difference between the estimated gain difference and the measured gain difference; and
    adjusting the optical signal transmitted through the optical network based at least in part on the degradation.

2. The method of claim 1, wherein at least one of the first and second reference signals is polarized.

3. The method of claim 1, wherein the polarization-related degradation comprises optical power loss.

4. The method of claim 1, wherein the polarization-related degradation comprises tilt.

5. The method of claim 1, wherein the polarization-related degradation comprises polarization-induced power variation.

6. The method of claim 1, wherein at least one of the first and second reference signals is transmitted at least in part over a wavelength division multiplexed system.

7. The method of claim 6, wherein the wavelength of one of the first and second reference signals is substantially at the shortest wavelength in the wavelength division multiplexed system and the wavelength of another one of the first and second reference signals is substantially at the longest wavelength in the wavelength division multiplexed system.

8. The method of claim 1, wherein the optical network comprises a wavelength division multiplexed system and the wavelength value of at least one of the first and second reference signals is outside of the range of optical data signal wavelengths transmitted through the system.

9. The method of claim 1, wherein at least one of the first and second reference signals is transmitted through a plurality of optical amplifiers in the optical network.

10. The method of claim 1, wherein at least one of the first and second reference signals is transmitted through a plurality of fiber optic links in the optical network.

11. The method of claim 1, wherein the at least one of the first and second reference signals is used as a data signal.

12. The method of claim 1, wherein the method is carried out in a DGTC-based transient control system.

13. The method of claim 1, wherein the method is carried out in a link-control based transient control system.

14. The method of claim 1, wherein the determining an estimated gain difference between a first reference signal and a second reference signal comprises:
    determining an estimated gain difference between a first reference signal and a second reference signal based at least in part on a number of amplification spans in the optical network, a slope of a Raman gain coefficient, a total optical power, and an effective fiber length.

15. An apparatus for adjusting an optical signal transmitted through an optical network comprising:
    a control circuit for:
        determining an estimated gain difference between a first reference signal and a second reference signal transmitted through an optical network;
        measuring a gain difference between the first reference signal and the second reference signal; and
        determining a degradation of the optical network based at least in part on a difference between the estimated gain difference and the measured gain difference, the degradation comprising at least polarization-related degradation; and
    a controller for adjusting at least one optical signal transmitted through the optical network based at least in part on the degradation.

16. The apparatus of claim 15, wherein at least one of the first and second reference signals is polarized.

17. The apparatus of claim 15, wherein the polarization-related degradation comprises optical power loss.

18. The apparatus of claim 15, wherein the polarization-related degradation comprises tilt.

19. The apparatus of claim 15, wherein the polarization-related degradation comprises polarization-induced power variation.

20. The apparatus of claim 15, wherein at least one of the first and second reference signals is transmitted at least in part over a wavelength division multiplexed system.

21. The apparatus of claim 20, wherein the wavelength of one of the first and second reference signals is substantially at the shortest wavelength in the wavelength division multiplexed system and the wavelength of another one of the first and second reference signals is substantially at the longest wavelength in the wavelength division multiplexed system.

22. The apparatus of claim 15, wherein the optical network comprises a wavelength division multiplexed system and the wavelength value of at least one of the first and second reference signals is outside of the range of optical data signal wavelengths transmitted through the system.

23. The apparatus of claim 15, wherein at least one of the first and second reference signals is transmitted through a plurality of optical amplifiers in the optical network.

24. The apparatus of claim 15, wherein at least one of the first and second reference signals is transmitted through a plurality of fiber optic links in the optical network.

25. The apparatus of claim 15, wherein at least one of the first and second reference signals is used as a data signal.

26. The apparatus of claim 15, wherein the controller is a dynamic gain tilt controller.

27. The apparatus of claim 15, wherein the controller is part of a link-control based transient control system.

* * * * *